April 2, 1963 KOICHI TSUGAWA 3,083,628
CAMERA
Filed Dec. 14, 1959 2 Sheets-Sheet 1

INVENTOR
KŌICHI TSUGAWA
By Stanley Wolder
ATTORNEY

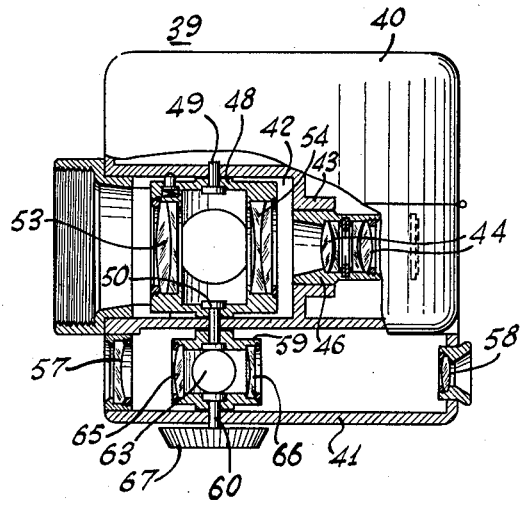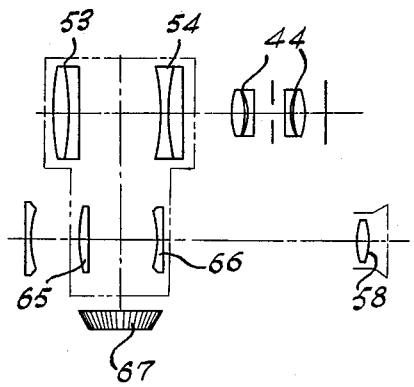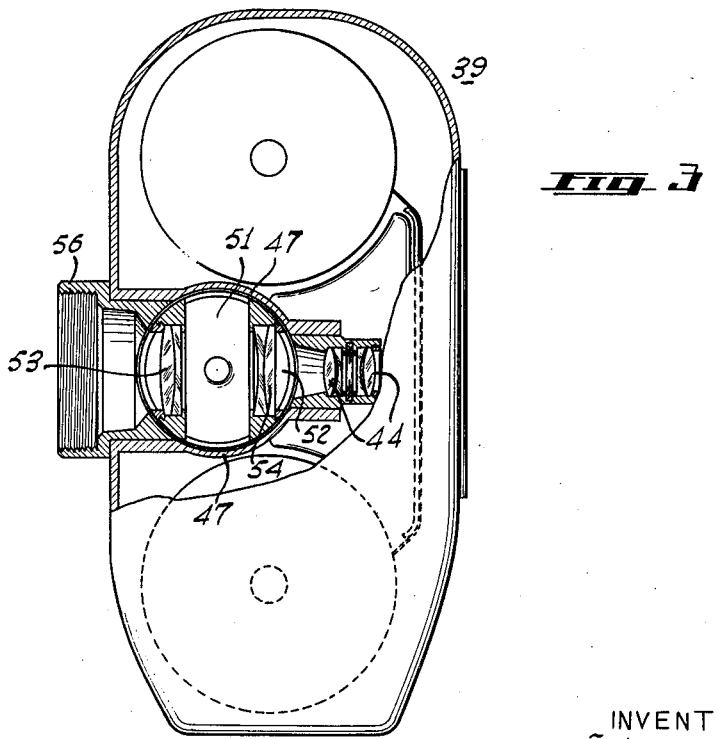

ically and in accordance with and controlled by the rotation of the support member 18.

United States Patent Office
3,083,628
Patented Apr. 2, 1963

3,083,628
CAMERA
Koichi Tsugawa, Tokyo, Japan, assignor to Yashica Co. Ltd., Tokyo, Japan, a corporation of Delaware
Filed Dec. 14, 1959, Ser. No. 859,449
1 Claim. (Cl. 95—44)

The present invention relates generally to improvements in cameras and it relates more particularly to an improved motion picture camera optical system of adjustable angle of view.

When using a motion picture camera it is very often desirable to vary the angle of view thereof from the standard or normal angle of view to a wide angle or a narrow or telephoto angle of view. This has heretofore been accomplished by the use of a multiplicity of replaceable lenses or conversion lens sections which are either individually attached to the camera along its optical axis or are carried on a turret and may be selectively switched into registry with the camera optical axis. Where the full lenses or supplemental lens sections are replaced, the operation is not only laborious, time consuming and subject to error but is also highly inconvenient in that it requires the separate carrying of the additional lenses. Where the lenses or conversion lens sections are mounted on a camera turret, while the switching of the lenses is relatively simple, the camera is bulky and awkward and as in the case of the individually replaceable lens systems, the requirement of a multiplicity of lens systems is very expensive. Furthermore, in these conventional cameras the likelihood is always present that the camera operator will not properly coordinate the camera lens with the finder angle of vision so that he is not obtaining the picture he desires. It is apparent from the above that the conventional motion picture camera, particularly of the amateur type possesses many drawbacks and disadvantages and leaves much to be desired.

It is therefore a principal object of the present invention to provide an improved camera.

Another object of the present invention is to provide an improved motion picture camera of adjustable angle of view.

Still another object of the present invention is to provide an improved motion picture camera of adjustable angle of view having a coupled finder which is automatically adjusted in accordance with the camera lens angle of view.

A further object of the present invention is to provide an improved motion picture camera of the above nature characterized by its compactness, ruggedness, low cost, versatility and ease of operation.

The above and other objects of the present invention will become apparent from a reading of the following description taken in conjunction with the accompanying drawings wherein:

FIGURE 3 is a side elevational view partially broken away and partially in section of another embodiment of the present invention;

FIGURE 4 is a top plan view thereof partially in section and partially broken away; and FIGURE 5 is a diagrammatic plan view of the camera lens system and finder lens system.

In a sense the present invention contemplates the provision of an improved camera of the character described including a main lens system, a lens support member rotatable about an axis substantially intersecting the optical axis of said main lens system and a supplemental lens system mounted on said support member and rotatable therewith between positions out of the path of said lens system and in alignment with the optical axis thereof.

According to a preferred form of the present invention the supplementary lens support is rotatable about an axis intersecting the main lens system optical axis and perpendicular thereto and is provided with through passageways arranged in quadrature. Located in one of the passageways is the supplementary lens system including a negative lens and a positive lens disposed on opposite sides of the axis of rotation of the support. Associated with the camera is a view finder including an objective lens, an ocular lens and an intermediate lens, slidable to vary the finder angle of vision and connected to a drum carried by the lens support by a flexible steel band. In accordance with another form of the present invention the finder slidable lens is replaced by a rotatable lens support which is rotatable with the supplementary lens support and is provided with a lens system corresponding with the supplementary lens system to vary the finder angle of vision with that of the camera lens. The main lens and supplementary lens systems are such that when the supplementary lens system is out of the path of the main camera lens, the camera and finder have standard intermediate angles of view; when the supplementary lens system optical axis coincides with the main lens system optical in a first sense an overall narrow or telephoto angle of view is effected in the camera and finder and when the optical axes coincide in an opposite sense a wide angle of view is achieved. The parameters of the lens system are such that they have a common focal plane in any of the above combinations. It is apparent from the above that there has been provided a camera having a variable angle of view, which is simple, compact, inexpensive and easy to operate.

Figure 1:
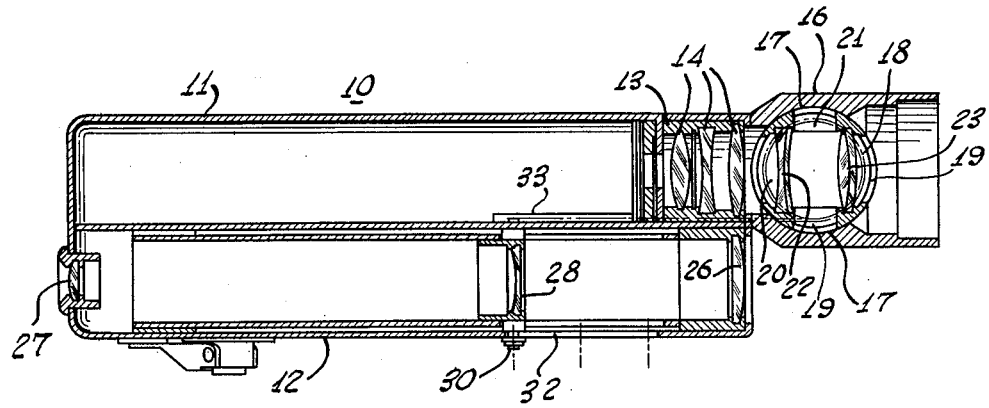
FIGURE 1 is a transverse horizontal cross sectional view of an improved motion picture camera embodying the present invention.
Figure 2:
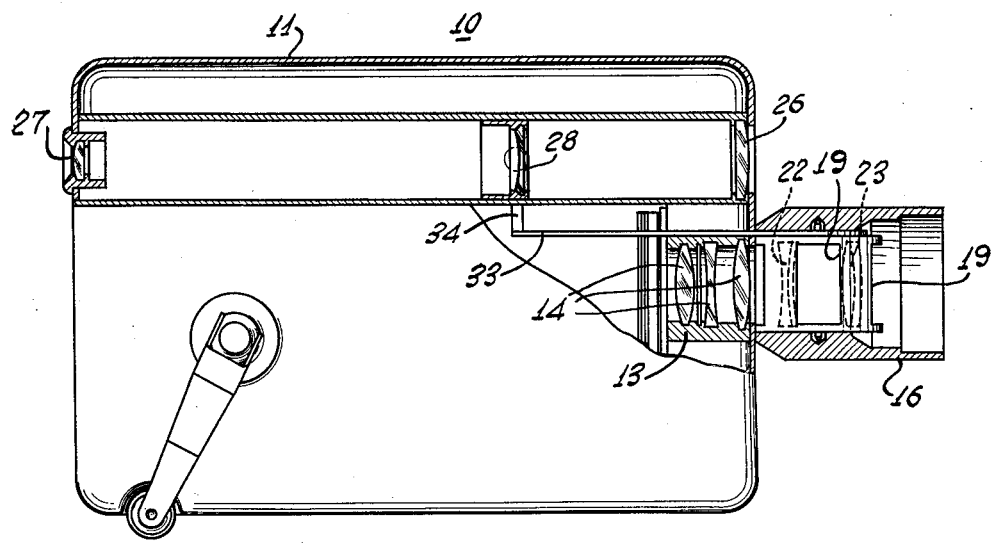
FIGURE 2 is a side elevational view thereof, partially broken away.

Referring now to the drawings, and more particularly to FIGURES 1 and 2 thereof which illustrate a preferred embodiment of the present invention, the reference numeral 10 generally designates the improved camera which includes a body member 11 provided with a finder having a longitudinally extending tubular barrel 12. The camera 10 is provided with the usual drive motor and shutter and film advancing mechanism. Located at the forward portion of the camera body 11 is a tubular barrel 13 carrying a plurality of spaced lenses which define the camera principal or main lens system 14 which has a normal angle of view and an image focal plane positioned in the path of the film, in the usual manner.

Communicating and coaxial with the main lens barrel 13 is a forwardly directed supplementary lens barrel 16 of somewhat greater diameter than the barrel 13. Formed in the inner face of the lens barrel 16 is a pair of oppositely disposed confronting, bearing defining, concave vertical cylindrical surfaces 17 which rotatably engage a hollow cylindrical supplementary lens support member or drum 18. The lens support member 18 is rotatable about an axis intersecting and perpendicular to the optical axis of the main lens system 14 and has formed in the wall thereof two pairs of diametrically opposed openings 19 which define passageways 20 and 21 through the support member 18. The passageways 20 and 21 are arranged in quadrature and are rotatable with the support member 18 into alternative coaxial alignment with the main lens optical axis. A supplementary lens system is mounted in the support 18 in registry with the passageway 20. The supplementary lens system includes a negative multielement lens 22 and a positive multielement lens 23 disposed in opposite ends of the passageway 20 and on opposite sides of the support member axis of rotation, the lens 22 and 23 being separated by a gap to leave the passageway 21 substantially free. Thus by rotation of the support 18 the open passageway 21 or the supplementary lens system in a forward or reverse sense may be selectively brought into registry with the main lens optical axis. It is important to note that the parameters and spacings of the various lenses are such, as can be readily determined by one skilled in the art, that the main lens alone, or in combination with the supplementary lens whether in a forward or a reverse orientation have a common focal plane and when the main lens system is employed alone it possesses a normal or intermediate angle of view, and when the overall lens system includes the supplementary lens system with the positive lens forward the angle of view is narrow or telephotographic, and with the negative lens forward the angle of view is wide.

The view finder includes a front objective lens 26 and a rear ocular lens 27 located at opposite ends of the finder barrel 12. Positioned between the finder lenses 26 and 27 is a frame mounted, longitudinally slidable intermediate lens 28 which is movable by a button or fingerpiece 30 secured to the intermediate lens frame by means of a shank registering with a longitudinal slot 32 formed in the side wall of the barrel 12. A longitudinally extending flexible steel band 33, has one end thereof secured to the upper, drum defining, border of the lens support member 18 and passes rearwardly through aligned guide openings to a cross arm 34 which extends through a longitudinal slot in the finder barrel 12 and is joined to the finder intermediate lens frame. When the lens 28 is in its rear position A the supplementary lens system and main lens system optical axes coincide and the positive lens 23 is forward to provide a telephoto or narrow angle photographic lens system, the finder likewise providing a corresponding telephoto view. Upon movement of the finder lens 28 by means of the button 30 to an intermediate position B, the flexible band 33 is pushed forwardly to rotate the support member 18, 90° counterclockwise as seen in FIGURE 1 of the drawing, to bring the free passageway 21 in registry with the main lens optical axis. As the band 33 is advanced it winds about the drum defining upper border of the support member 18. In this latter position both the finder and the photographic lens system which includes only the main lens system presents an intermediate or normal angle of view. Upon further advance of the finder lens to its forwardmost position C the support member 18 is rotated an additional 90° to bring the main and supplementary lens optical axes in registry, with the negative lens 22 forward, in which position the photographic lens system and finder system have corresponding wide angles of view.

In employing the improved camera described above the operator merely observes the subject through the finder and moves the button 30 to any of the positions A, B or C until he obtains the view he desires. A corresponding image is projected on the film and he may then actuate the camera. It is obvious that the operation and adjustment of the improved camera is of the utmost simplicity. Moreover, the camera is both inexpensive and compact.

In FIGURES 3 to 5 of the drawings there is illustrated another embodiment of the present invention differing essentially from that first described in the mounting of the supplementary lens system, the finder construction and its coupling to the supplementary lens. More particularly, the improved camera 39 includes a body section 40 on a side wall of which is mounted a longitudinally extending finder barrel 41. Formed in the front of the camera body 40 is a deep well 42 terminating in a rearwardly directed coaxial collar 43 of reduced cross section. A main lens system 44 of normal or intermediate angle of view is mounted in a lens barrel 46 registering with the collar 43 and its image focal plane is on the path of the advancing film.

The trailing inner confronting upper and lower faces of the well 42 are horizontally concavely cylindrically shaped as at 47 and rotatably engages a correspondingly cylindrically shaped supplementary lens support member 48. The lens support 48 is journalled to the well side walls by aligned horizontal shafts, 49 and 50, the shaft 50 projecting laterally into the finder barrel 41. Formed in the lens support member 48 are a pair of diametrically extending, through passageways 51 and 52 arranged in quadrature perpendicular to the axis of rotation of the lens support member 48. A supplementary lens system is mounted in the passageway 52 and includes a first multielement positive lens 53 located at one end of the passageway 52 and a second multielement negative lens 54 located in the opposite end of the passageway. The lenses 53 and 54 are separated by a gap coinciding with the free passageway 51 and their parameters and that of the main lens system 44 are such as to provide lens systems having a common focal plane and wide, normal and narrow angles of view, depending upon the registry and orientation of the supplementary lens system with the main lens system as set forth in connection with the first described embodiment. A stepped barrel 56 registers with the front opening of the well 42 and has a trailing cylindrical surface engaging the face of the lens support 48.

The finder barrel 41 carries an objective lens 57 at its leading end and an aligned ocular lens 58 at its trailing end. Located in the finder barrel 41 between the lenses 57 and 58 is a finder intermediate lens system support 59 which is rotatably supported therein by the shaft 50 and a collinear opposite shaft 60 extending through the outer side wall of the finder barrel 41. The lens supports 48 and 59 are rigidly joined by the connecting shaft 50, the lens support 59 having through passageways 63 and 64 formed therein, which are respectively parallel to the passageways 51 and 52 formed in the lens support 48. A finder intermediate lens system is mounted in the passageway 64 and includes a positive lens 65 located at one end of the passageway and a negative lens 66 located at the other end thereof, the positive lenses 53 and 65 and the negative lenses 54 and 66 respectively lying on common sides of the axis of rotation of the lens supports 48 and 59. Thus, the photographic supplementary lens system and the finder intermediate lens system assume a similar disposition and orientation relative to the camera main lens and finder systems respectively. Moreover, the parameters of these lenses are such that the image viewed through the finder corresponds to that projected on the plane of the film. A knob 67 is affixed to the free end of the shaft 60 and permits the manipulation of the lens supports 48 and 59.

The operation of the camera 39 is similar to that previously described. The operator merely views the subject through the camera finder, rotating the knob 67 to either of the three positions thereof until the desired image is observed, the supplementary lens support being concurrently rotated with the adjustment of the finder intermediate lens to project a corresponding image on the plane of the film.

While there have been described and illustrated preferred embodiments of the present invention it is apparent that numerous alterations, omissions and additions may be made without departing from the spirit thereof.

What is claimed is:

A camera having means for transporting film along a predetermined plane comprising a variable picture lens system including a main lens system having an image focal plane substantially coinciding with the plane of said film and a lens support member rotatable about an axis intersecting the optical axis of said main lens system and substantially perpendicular thereto and a supplementary lens system mounted on said support member and rotatable therewith between a first position out of the path of said main lens system and a second position in alignment with the optical axis thereof, the combination of said main lens system and said aligned supplemental lens system having an image focal plane substantially coinciding with the plane of said film, and a view finder mounted on said camera and including an objective lens and an ocular lens and an intermediate lens slidable along the optical axis between said objective lens and said ocular lens, and means connecting said intermediate lens to said supplementary lens support to concurrently rotate said support with the movement of said intermediate lens.

References Cited in the file of this patent

UNITED STATES PATENTS

| | | |
|---|---|---|
| 1,236,722 | Lange | Aug. 14, 1917 |
| 2,327,859 | Bolsey | Aug. 24, 1943 |
| 2,945,415 | Bechtold | July 19, 1960 |
| 3,006,262 | MacMillin | Oct. 31, 1961 |

FOREIGN PATENTS

| | | |
|---|---|---|
| 1,180,278 | France | Dec. 29, 1958 |
| 808,395 | Great Britain | Feb. 4, 1959 |